(12) United States Patent
Ikeda

(10) Patent No.: US 8,159,483 B2
(45) Date of Patent: Apr. 17, 2012

(54) ELECTROLYTIC DEPOSITION DISPLAY APPARATUS AND DRIVE METHOD THEREOF

(75) Inventor: Hajime Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 419 days.

(21) Appl. No.: 12/553,714

(22) Filed: Sep. 3, 2009

(65) Prior Publication Data

US 2010/0072070 A1    Mar. 25, 2010

(30) Foreign Application Priority Data

Sep. 25, 2008 (JP) .................. 2008-246338

(51) Int. Cl.
*G09G 5/00* (2006.01)
(52) U.S. Cl. .................... 345/204; 345/107
(58) Field of Classification Search .............. None
See application file for complete search history.

(56) References Cited

U.S. PATENT DOCUMENTS

| | | | |
|---|---|---|---|
| 7,907,323 B2 * | 3/2011 | Shimotani et al. ............ | 359/270 |
| 2006/0038799 A1 * | 2/2006 | Tanaka et al. ................. | 345/204 |
| 2006/0152438 A1 | 7/2006 | Tanaka | |
| 2007/0063964 A1 * | 3/2007 | Kawahara et al. ............ | 345/107 |
| 2010/0265219 A1 * | 10/2010 | Noguchi et al. .............. | 345/204 |

FOREIGN PATENT DOCUMENTS

| JP | 2003-337350 | | 11/2003 |
|---|---|---|---|
| JP | 2003-337350 | A | 11/2003 |
| JP | 2004-170850 | A | 6/2004 |

\* cited by examiner

*Primary Examiner* — Joseph Haley
(74) *Attorney, Agent, or Firm* — Fitzpatrick, Cella, Harper & Scinto

(57) ABSTRACT

A plurality of pixels, each including first and second electrodes and an electrolytic solution, are arranged. When a voltage between the first and the second electrodes increases into a precipitation critical value or more, the precipitation of electroplating starts. When the voltage decreases into a value smaller than the deposition overvoltage value, the precipitation ends. A control unit controlling the voltage between the first and second electrodes repeats a subfield operation including a first operation of selectively supplying any of first, a second voltage and third voltages to the plurality of pixels, and a second operation of collectively supplying the second voltage value to the plurality of pixels after the first operation, at least two times or more, to control the gradation of each pixel based on a timing of supplying the third voltage.

12 Claims, 8 Drawing Sheets

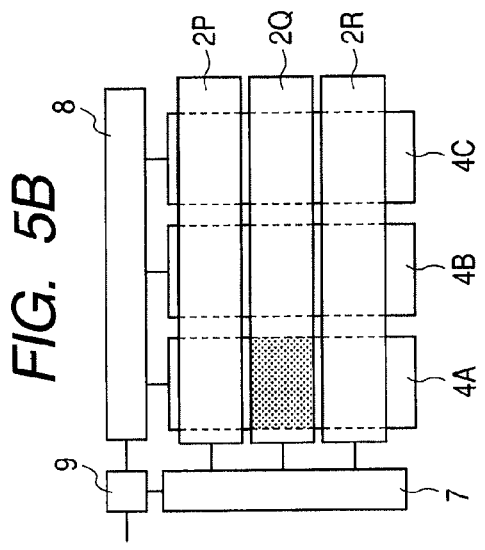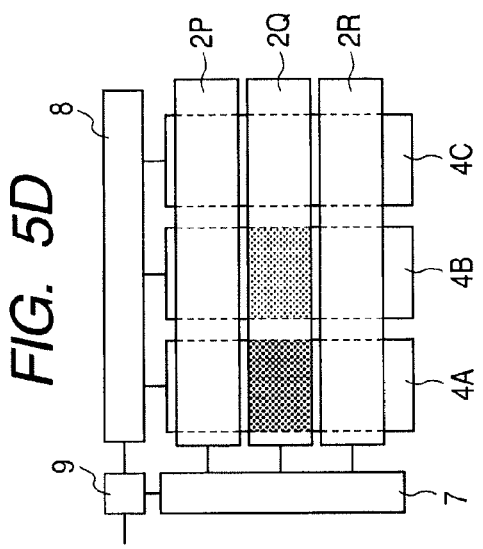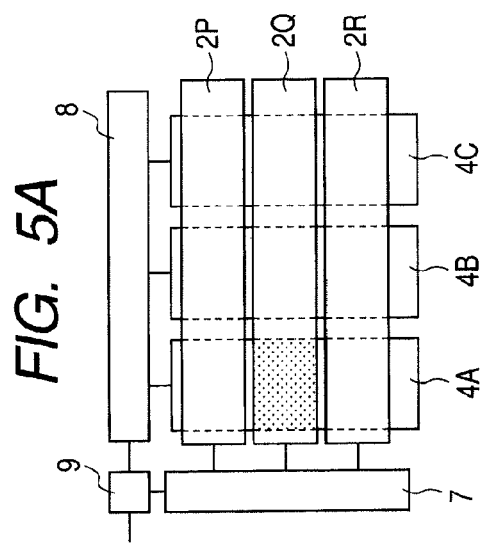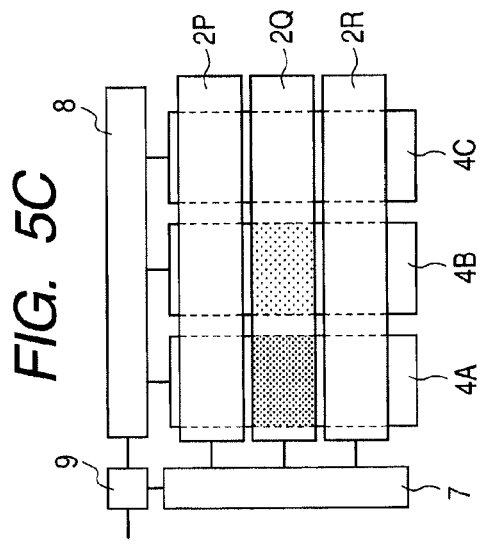

ELECTROLYTIC DEPOSITION DISPLAY APPARATUS AND DRIVE METHOD THEREOF

BACKGROUND OF THE INVENTION

1. Field of the Invention

The present invention relates to an electrolytic deposition display apparatus using electroplating for light modulation and a drive method thereof, and more particularly to a display apparatus suitable for the so-called electronic paper and a drive method thereof.

2. Description of the Related Art

In recent years, the development of the electronic paper has been actively performed as a display apparatus having high visibility and little power consumption. An electrolytic deposition display apparatus using electroplating for light modulation has been observed as a display apparatus suitable for such electronic paper from the point of view of light resistance. Examples of such electrolytic deposition display apparatus are described in Japanese Patent Applications Laid-Open No. 2003-337350 and No. 2004-170850.

Japanese Patent Application Laid-Open No. 2003-337350 discloses a display apparatus displaying an image by applying a voltage to each pixel with electrodes arranged in a matrix to precipitate or dissolve electroplating. Then Japanese Patent Application Laid-Open No. 2003-337350 discloses the drive method of selectively applying the voltage of a precipitation critical voltage (threshold voltage) or more to a pixel at which electroplating is precipitated to perform the address drive and of adding a voltage lower than the precipitation critical voltage to the pixel after the address drive. To put it concretely, the method precipitates a crystal, which becomes a nucleus, at a predetermined pixel by the address drive of applying the voltage of the precipitation critical voltage (threshold voltage) or more to the pixel. After that, the method additionally precipitates electroplating at the pixel subjected to the address drive or holds the written state of the pixel by applying a voltage lower than the precipitation critical voltage (threshold voltage).

Moreover, Japanese Patent Application Laid-Open No. 2004-170850 discloses the method of displaying gradations by controlling the time of adding the precipitation critical voltage to the pixel electrodes. Japanese Patent Application Laid-Open No. 2004-170850 discloses the method of controlling the time of adding the precipitation threshold voltage by dividing the time of applying the precipitation threshold voltage into a plurality of sub fields and by selecting the application of the voltage to each sub field. Thereby the method of Japanese Patent Application Laid-Open No. 2004-170850 realizes a multiple gradation display.

However, Japanese Patent Application Laid-Open No. 2003-337350 does not disclose the performance of any multiple gradation displays, although the publication discloses the capability of performing a binary (black-and-white) display. Moreover, it is not easy to realize a multiple gradation display by the method of Japanese Patent Application Laid-Open No. 2003-337350 in consideration of the timing of selecting a pixel in an electrolytic deposition display apparatus arranging a plurality of pixels in a matrix therein.

Moreover, a selected pixel is in the state in which the voltage of the precipitation threshold voltage or more is always applied thereon by the method of Japanese Patent Application Laid-Open No. 2004-170850, and that state influences the surface state of the precipitated electroplating. Consequently, it is difficult to form the electroplating having a good reflection property or a good absorption property, and there is the possibility that it is impossible to obtain a good gradation property.

SUMMARY OF THE INVENTION

Accordingly, the present invention is directed to provide an electrolytic deposition display apparatus enabling the realization of a multiple gradation display capable of obtaining a good gradation property.

A display apparatus of the present invention includes a plurality of pixels, each including a first electrode, a second electrode disposed in opposition to the first electrode and an electrolytic solution containing metal ion and disposed in contact with the first and second electrodes; a control unit for setting a value of a voltage applied between the first and second electrodes, so that a precipitation by an electroplating starts when the value of the voltage between the first and second electrodes exceeds a deposition overvoltage value, and the precipitation by the electroplating ends when, after the precipitation by the electroplating starts, the value of the voltage between the first and second electrodes is reduced into a predetermined value smaller than the deposition overvoltage value, wherein the control unit repeats at lest twice a subfield operation including a first operation for applying selectively to each of the plurality of pixels a voltage of any one of a first voltage value larger than the predetermined value, a second voltage value lager than the first voltage value and smaller than the deposition overvoltage value and a third voltage value lager than the deposition overvoltage value, and a second operation for applying to the plurality of pixels the voltage of the second voltage value after the first operation, and wherein the control unit controls a gradation of the pixel according to a timing of applying the voltage of the third voltage value.

Moreover, a drive method of a display apparatus of the present invention is performed to a display apparatus including a plurality of arranged pixels, each of which includes a first electrode, a second electrode arranged to be opposed to the first electrode, an electrolytic solution arranged in contact with the first and second electrodes, which electrolytic solution includes metal ions. Then, when a voltage value of a voltage applied between the first and second electrodes becomes a deposition overvoltage value or more, the method starts a precipitation of electroplating. When the voltage value becomes a predetermined voltage value less than the deposition overvoltage value after the precipitation has started, the method ends the precipitation. Here the method performs a first operation of selectively supplying any voltage value among a first voltage value of the predetermined voltage value or more, a second voltage value larger than the first voltage value and less than the deposition overvoltage value, and a third voltage value of the precipitation critical voltage or more to each of the plurality of pixels. Then, the method performs a second operation of collectively supplying the second voltage value to the plurality of pixels after the first operation. The method repeatedly performs a subfield operation including the first operation and the second operation at least two times or more, and controls the gradations of the pixels on the timing of supplying the third voltage value.

According to the present invention, a nucleation operation of nucleating the precipitation nuclei of the electroplating of only a selected pixel is performed by applying the voltage of the precipitation critical voltage or more between the electrodes of the selected pixel and by applying a voltage less than the precipitation critical voltage between the electrodes of not selected pixels among the plurality of pixels. Moreover, a nucleus growing operation of collectively applying a voltage less than the precipitation critical voltage and equal to or more than the voltage of ending a precipitation between the electrodes of the plurality of pixels is performed. Then, a subfield operation including the nucleation operation and the nucleus growing operation is performed a plurality of times. Furthermore, the timing of the nucleation operation is regulated every pixel according to a required gradation. By performing these operations, a multiple gradation display is enabled. Moreover, because not always the precipitation critical voltage is applied and the continuation (growth) of the precipitation of electroplating is performed by the voltage less than the precipitation critical voltage at the time of continuing the precipitation, the electroplating having a good reflection property or a good absorption property can be formed. Thereby, the present invention can provide an electrolytic deposition display apparatus enabling the realization of a multiple gradation display capable of obtaining a good gradation property.

Further features of the present invention will become apparent from the following description of exemplary embodiments with reference to the attached drawings.

BRIEF DESCRIPTION OF THE DRAWINGS

FIGS. 5A, 5B, 5C, and 5D are schematic views illustrating each operation state of the electrolytic deposition display apparatus according to the present invention.

DESCRIPTION OF THE EMBODIMENTS

Figure 2A:
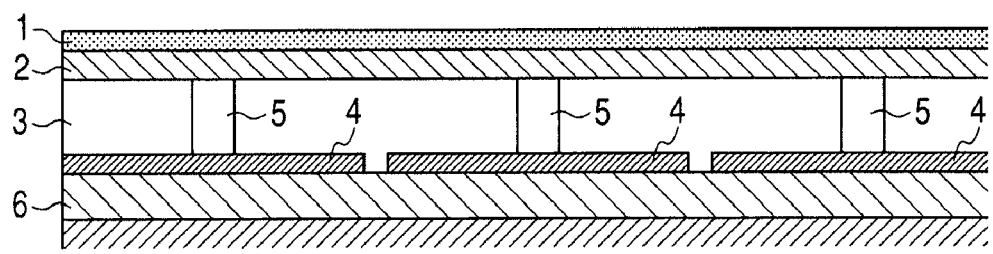
FIGS. 2A and 2B are schematic views of the electrolytic deposition display apparatus according to the present invention.
Figure 2B:
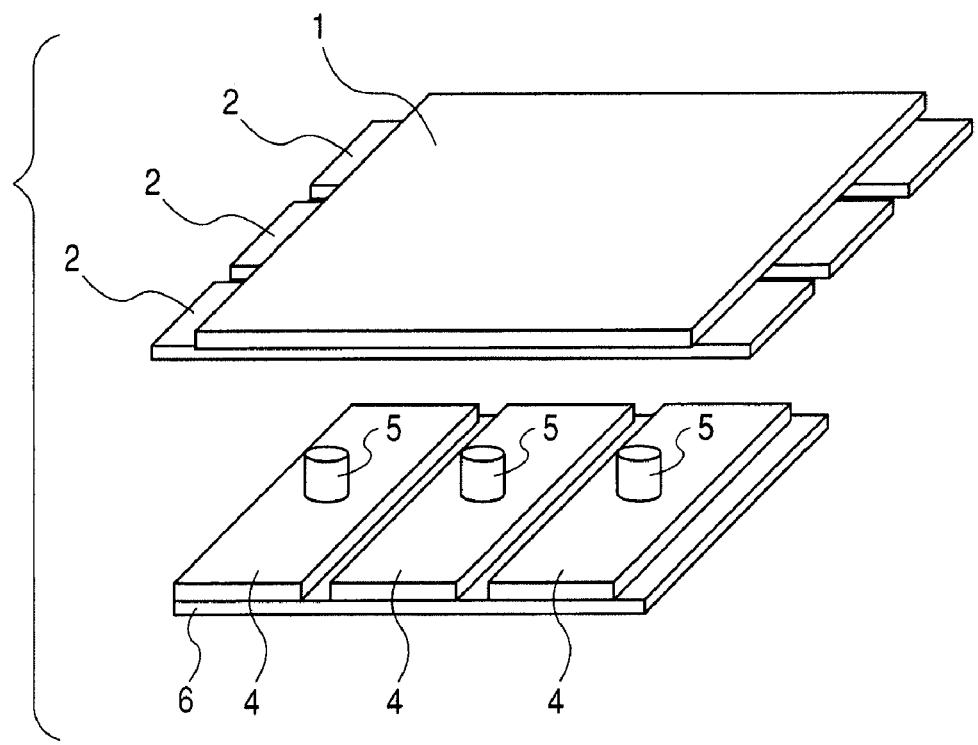

In the following, concrete embodiments for implementing the present invention will be minutely described with reference to the attached drawings. FIG. 2A is a sectional view illustrating a reflection type display apparatus of an embodiment as an electrolytic deposition display apparatus of the present invention, and the structure of the apparatus will be described with reference to FIG. 2A. Incidentally, the electrolytic deposition display apparatus of the present embodiment can be applied to either of a passive matrix drive and an active matrix drive. FIG. 2B illustrates a perspective view of the electrolytic deposition display apparatus adopting the passive matrix drive. Incidentally, FIG. 2A illustrates the configuration common to both of the passive matrix drive and the active matrix drive.

In the electrolytic deposition display apparatus illustrated in FIGS. 2A and 2B, an optically transparent first electrode 2 made of indium tin oxide (ITO) or the like is arranged on a surface of an optically transparent supporting substrate 1 for protecting a surface of the apparatus. A supporting substrate 6 is arranged to be opposed to the supporting substrate 1, and a second electrode 4 is arranged on the supporting substrate 6 to be opposed to the first electrode 2. The second electrode 4 can be made of the same metallic material as those of the metal ions that are included in an electrolytic solution 3, described below, and can be electrolytically precipitated by an ion electroplating method. Spacers 5 are provided between the supporting substrates 1 and 6 for holding the interval between them, and the electrolytic solution 3 is arranged in the region formed between the first electrode 2 and the second electrode 4 in contact with the first electrode 2 and the second electrode 4. The electrolytic solution 3 includes the metal ions capable of being electrolytically precipitated by the electroplating method. The metal ions are precipitated on the first electrode 2 or the second electrode 4 as electroplating by a voltage applied between the first electrode 2 and the second electrode 4 or by the direction of a current flowing between the first electrode 2 and the second electrode 4. If the voltage is applied between the first electrode 2 used as a cathode and the second electrode 4 used as an anode to make a current flow between the first electrode 2 and the second electrode 4 through the electrolytic solution 3, then the metal ions included in the electrolytic solution 3 are reduced to be precipitated on the surface of the first electrode 2, and electroplating is formed on the first electrode 2. The color of the electroplating can be viewed from the pixel on which the electroplating is formed. At this time, the color of the electroplating to be precipitated is influenced by the compositions of the first electrode 2 and the electrolytic solution 3. For example, if the first electrode 2 is made of ITO and the electrolytic solution 3 is a solution including silver ions, then black color electroplating can be formed, and the black color can be viewed from the surface of the electroplating. If the direction of the current is reversed, then the precipitated electroplating is oxidized, and the precipitated electroplating is dissolved into the electrolytic solution 3. A pixel on which no electroplating is formed is transparent, or the color of a reflected light from the second electrode 4 or a colored reflecting body arranged on the back surface of the second electrode 4 is viewed from the pixel. By performing electroplating to each pixel in this manner, a matrix display is enabled. Incidentally, although the description has been given to the example of applying a voltage between the first electrode 2 used as the cathode and the second electrode 4 used as the anode to form the electroplating on the first electrode 2 here, the voltage may be applied between the second electrode 4 used as a cathode and the first electrode 2 used as an anode. In this case, electroplating is formed on the second electrode 4. Incidentally, the electrolytic deposition display apparatus is composed of a plurality of two-dimensionally arranged pixels, each composed by including the first electrode 2, the second electrode 4, and the electrolytic solution 3.

Although the color of electroplating has been described to be regulated by the materials of the electrodes 2 and 4 and the electrolytic solution 3 in the above description, the film color of the electroplating can be also controlled by a current density. For example, if the first electrode 2 is made of ITO and zinc is electroplated on the surface of the ITO, then a white color film is precipitated on the first electrode 2 when the zinc is electroplated by a low current density of about 30 mA/cm², and a black color film is precipitated on the first electrode 2 when the zinc is electroplated by a high current density of about 100 mA/cm². By using the phenomenon, the first electrode 2 can be electroplated in a black color, and the second electrode 4 can be electroplated in a white color or vice versa.

The phenomenon can be described as follows by the concept of a limiting current density. If an electric double layer on the surface of an electrode contacting with an electroplating solution is observed, then the metal ion concentration in the electric double layer is regulated on the balance between the consumption of the ions by an electrolytic deposition and the supply of the ions by diffusion from the inside of the solution. The consumption speed of the ions is proportioned to a current density. Because the supply of the ions by the diffusion is dominant over the consumption of the ions at the time of a sufficiently low current density, the ions abundantly exist in the neighborhood of the surface of the electrode, and the site at which the surface energy of electroplating takes a local minimum is electrolytically precipitated preferentially. As a result, the surface on the side contacting with the electrode of the electroplating becomes smooth, and if the electrode is made of a metal of a white color, then the electrode assumes the white color. However, the consumption speed of the ions becomes equal to the supply speed of the ions at a certain current density. The certain current density is referred to as a limiting current density. Because the ion concentration in the electric double layer becomes almost zero at the limiting current density and the electric double layer is always in the state of the lack of the ions, the ions supplied by the diffusion are immediately electrolytically precipitated without any surpluses of selecting a precipitating site. As a result, the surface of electroplating on the side contacting with the electrode becomes sparse, and the electrode assumes a black color. The phenomenon of assuming a black color in this manner is also caused at a current density in the neighborhood of the limiting current density. The smoothness of the surface of electroplating on the side contacting with the electrode can be controlled and the color of the electroplating can be controlled by controlling the current density of the current flowing between electrodes in this manner.

The limiting current density can be judged by a color. When a current density is gradually raised to the neighborhood of a limiting current, a film becomes coarse. As a result, the film becomes black. The current density at which the color becomes the black color can be set as the limiting current density or a current density in the neighborhood of the limiting current density. Although a change of the color by the limiting current density can be clearly judged by a visual observation as described above, the change can be quantified further by measuring a reflectance. When a current density is being raised over the current density at which a film becomes black, no electroplating is caused, and a powder is produced in the solution. Consequently, if electroplating is made to be a black color, it is desirable to set the current density at the same value as that of the limiting current density, or at a value lower than that of the limiting current density and being in the neighborhood of the value of the limiting current density.

Electroplating of a white color and that of a black color can be formed by changing the current density in this manner. That is, if both of the first electrode 2 and the second electrode 4 are made of ITO and the current of the value of the limiting current density or a value in the neighborhood of the limiting current density is made to flow between the first electrode 2 used as a cathode and the second electrode 4 used as an anode, then the first electrode 2 is electroplated, so that the surface thereof becomes a black color. On the other hand, if the current of being sufficiently lower than the limiting current density is made to flow between the second electrode 4 used as a cathode and the first electrode 2 used as an anode, then the second electrode 4 is electroplated, so that the surface thereof becomes a white color. A further gradation display is enabled by suitably applying the aforesaid system to a gradation display system, which will be described in the following.

The electroplating formed/dissolved on the surface of the first electrode 2 and/or the second electrode 4 has a function capable of controlling a gradation by adjusting the light transmittance or the light reflectance of the electroplating by adjusting the film thickness thereof. In the following, the phenomena on this occasion will be described with reference to FIGS. 3A to 3C.

Figure 3A:
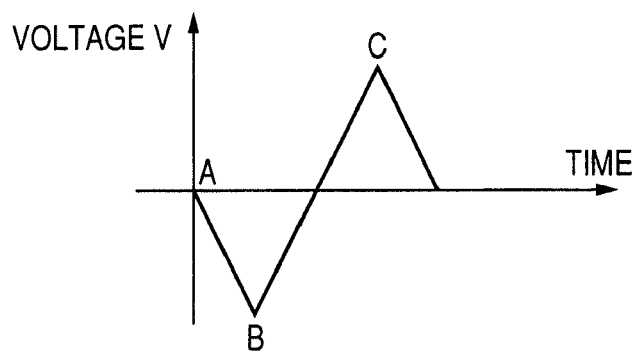
FIGS. 3A, 3B, and 3C are diagrams illustrating characteristics for describing phenomena in the present invention.
Figure 3B:
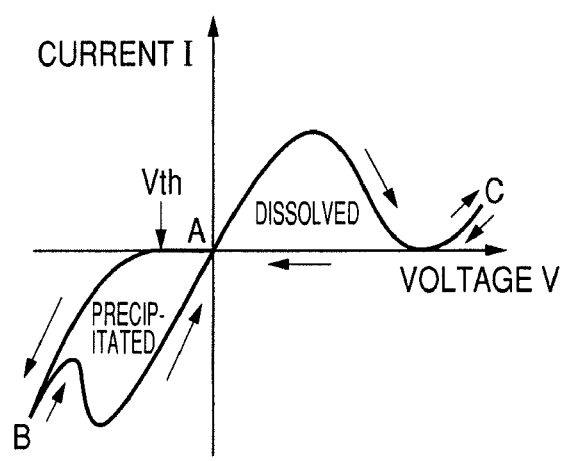

The voltage of a triangular waveform illustrated in FIG. 3A is applied to the first electrode 2 of FIG. 2A, and the correlation between the voltage value of the first electrode 2 and the current between the first electrode 2 and the second electrode 4 is observed by the cyclic voltammetry, so that a current-voltage transient response characteristic can be obtained, which current-voltage transient response is illustrated in FIG. 3B. Here the points A, B, and C of FIG. 3B correspond to the points A, B, and C of FIG. 3A, respectively. Incidentally, it is assumed in the present description that ITO is used for the first electrode 2, that silver is used for the second electrode 4, and that silver ions are included in the electrolytic solution 3.

The first electrode 2 is in the state of having no electroplating precipitated thereon at the point A of FIG. 3B. If a voltage having a negative polarity is applied between the first electrode 2 used as the cathode and the second electrode 4 used as the anode in this state and the voltage value is made to be growing larger, then no electroplating is precipitated for a while. Then, when the voltage value exceeds a "certain threshold" $|V_{th}|$, the precipitation of electroplating to the first electrode 2 starts, and a current flows from the second electrode 4 to the first electrode 2. Here the "certain threshold," at which the precipitation of electroplating starts onto an electrode on which no electroplating is precipitated, is referred to as a "deposition overvoltage value," which is a value of a precipitation critical voltage. At this time, the ionization of silver is caused on the surface of the second electrode 4 contacting with the electrolytic solution 3 by the reaction of $Ag \rightarrow Ag^+ + e^-$, and silver plating is precipitated on the surface of the first electrode 2 by the reaction of $Ag^+ + e^- \rightarrow Ag$. The precipitation of electroplating is started by the nucleation of precipitation nuclei of the electroplating on the first electrode 2, and the quantity (thickness) of the precipitated electroplating increases as the precipitation nuclei grow. A voltage value of the negative polarity that is larger than the deposition overvoltage value $|V_{th}|$ is needed for the occurrence of this reaction, and the precipitation of electroplating to the first electrode 2 does not start by the voltage of a value smaller than the deposition overvoltage value $|V_{th}|$. In FIG. 3B, a current starts to flow when the voltage of a value of the deposition overvoltage value $|V_{th}|$ or more is supplied, and the phenomenon described above is observed. When the voltage value to the first electrode 2 is enlarged to be larger than the deposition overvoltage value $|V_{th}|$ to the negative polarity, the current value increases, and the quantity of the electroplating (silver plating) precipitated per time becomes larger. Then, the largest negative direction current value is observed when the voltage value applied to the first electrode 2 is made to the value corresponding to the point B of FIG. 3A (point B of FIG. 3B).

The voltage value at the first electrode 2 is successively being reduced along the triangular waveform, and the voltage value becomes the one less than the deposition overvoltage value $|V_{th}|$. Even after that time, the precipitation continues. Then, when the voltage value becomes a predetermined voltage value, which corresponds to the point A of FIG. 3B, less than the deposition overvoltage value $|V_{th}|$, the precipitation of the electroplating ends. After the passing of the point A, the current of the positive direction, the reverse direction to the direction at the time of precipitation, starts to flow, and the electroplating precipitated on the first electrode 2 dissolves into the electrolytic solution 3. When all of the electroplating precipitated on the first electrode 2 has dissolved, no currents flow once. Then, when the voltage value at the first electrode 2 is made to be further larger into the positive direction, some currents flow by the reactions of the components other than silver in the electrolytic solution 3a. This current corresponds to the point C in FIG. 3B.

Figure 3C:
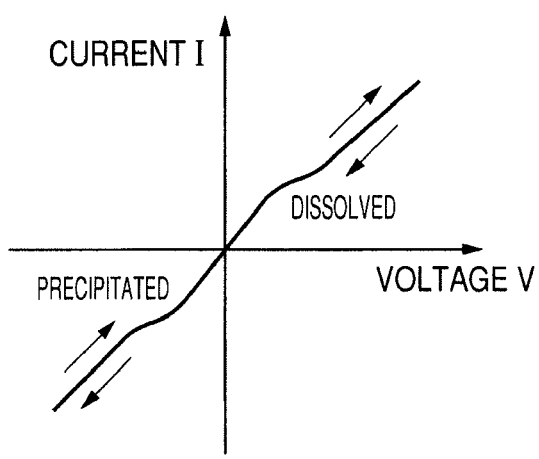

On the other hand, a current-voltage transient response characteristic in the case of using silver for both of the first electrode 2 and the second electrode 4 is illustrated in FIG. 3C. A current flows almost in proportion to a voltage value, and the inclination of the curve is almost constant in FIG. 3C. Important information exhibited in FIG. 3C is that the resistance value of the electrode made of silver does not almost change when silver, which is the same metal, is plated on the electrode. This phenomenon indicates the same case as the state in which silver plating is formed on the first electrode 2 made of ITO in the former example, and this phenomenon suggests that the quantity (thickness) of electroplating to be precipitated on the first electrode 2 in proportion to the voltage value can be controlled in the state in which the electroplating is formed on the first electrode 2. It is known that the thickness of the electroplating precipitated on the first electrode 2 can be adjusted by controlling the electrification charge quantity, which is the time integration of the current flowing in the same direction between the first electrode 2 and the second electrode 4 as illustrated in FIGS. 3B and 3C, and that a gradation display can be performed thereby. The present invention uses the principle mentioned above to a maximum extent as it will be described later.

Figure 1:
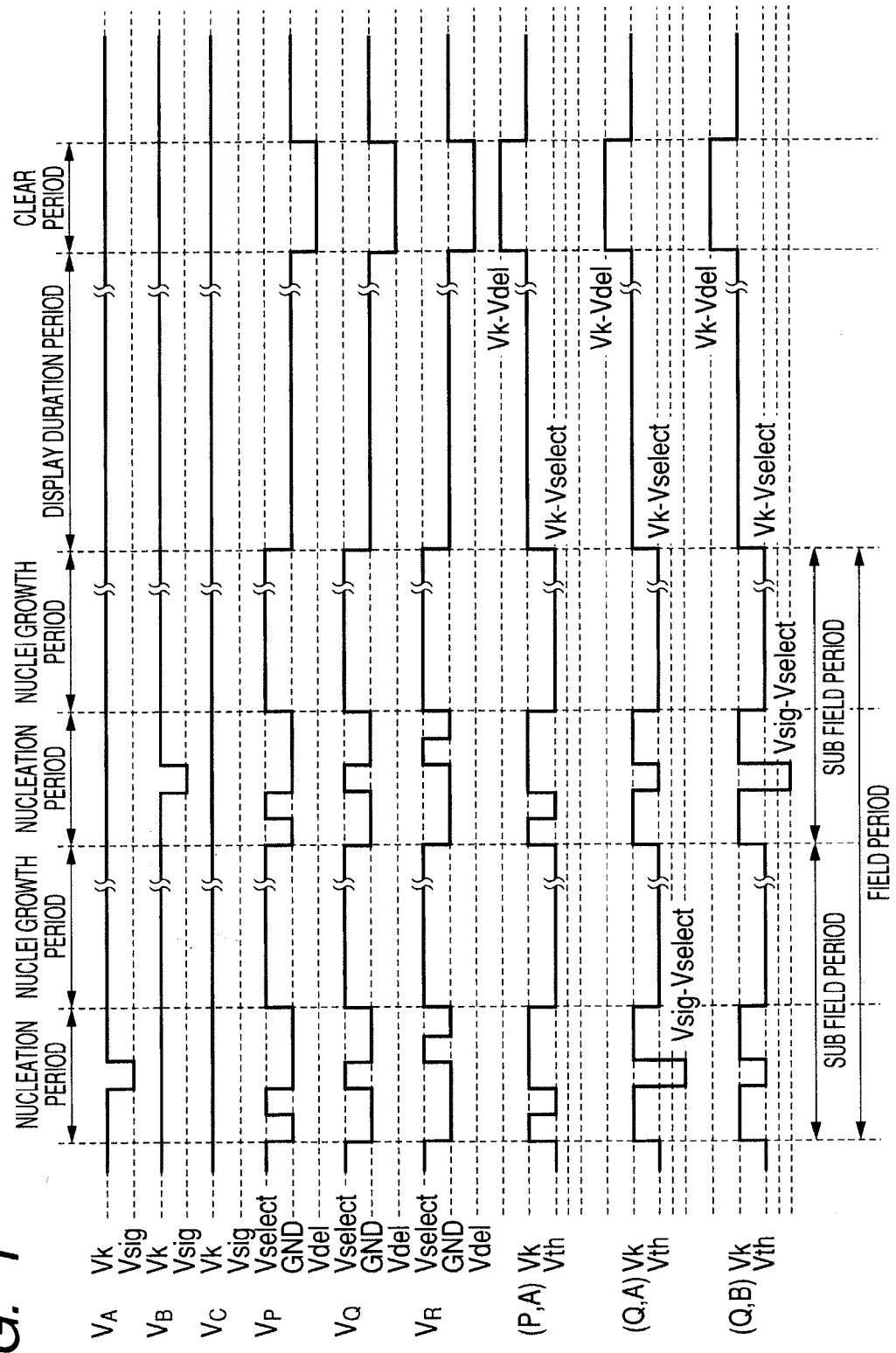
FIG. 1 is a timing chart of an electrolytic deposition display apparatus according to the present invention.
Figure 4:
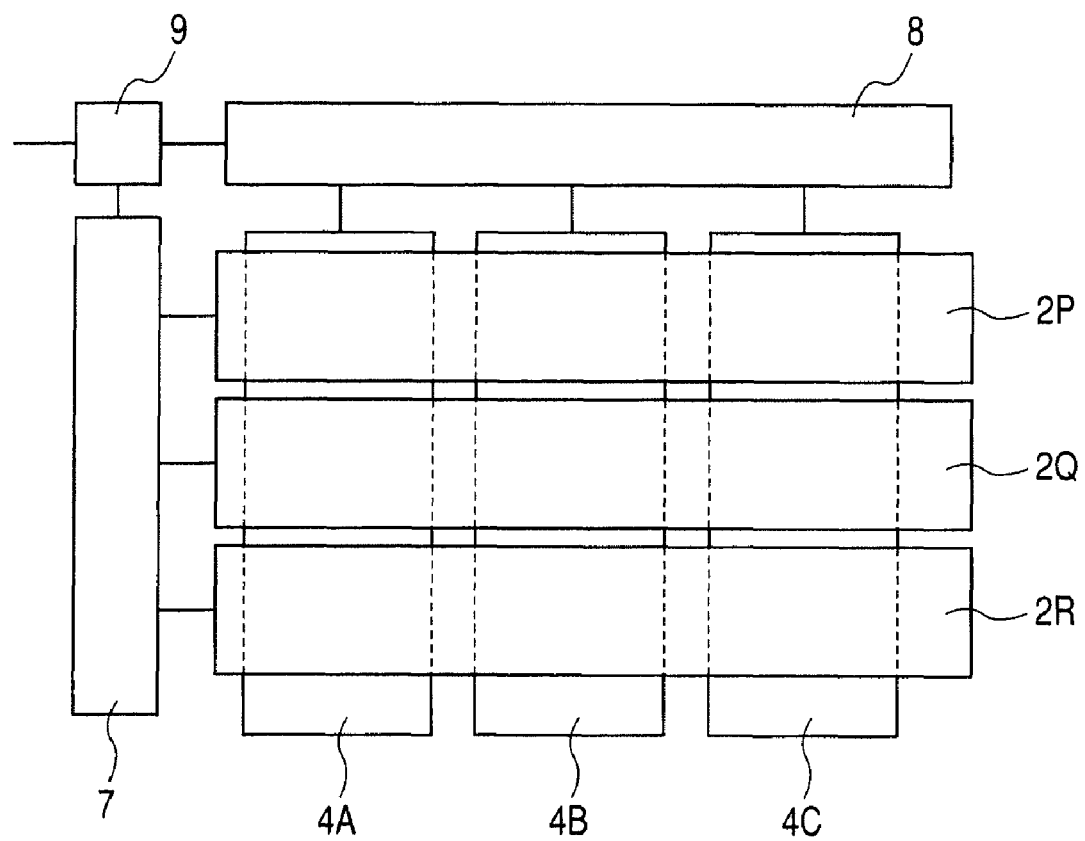
FIG. 4 is a schematic view of an electrolytic deposition display apparatus adopting a passive matrix drive system according to the present invention.

Next, an electrolytic deposition display apparatus and a drive method according to the present invention will be concretely described with reference to FIGS. 1 and 4. FIG. 4 is a schematic view of an electrolytic deposition display apparatus adopting a passive matrix drive system according to the present invention, and FIG. 1 is a timing chart of the display apparatus of FIG. 4.

First, the configuration of the electrolytic deposition display apparatus adopting the passive matrix drive system according to the present invention will be described with reference to FIG. 4. In FIG. 4, the first electrode 2 is divided by the row, and the divided pieces of the first electrode 2 are denoted as follows: the first electrode 2 on a $P^{th}$ row is denoted by 2P; the one on a $Q^{th}$ row is denoted by 2Q; and the one on an $R^{th}$ row is denoted by 2R. Moreover, the second electrode 4 is divided by the column, and the divided pieces of the second electrode 4 are denoted as follows: the second electrode 4 on an $A^{th}$ column is denoted by 4A; the one on a B th column is denoted by 4B; and the one on a $C^{th}$ column is denoted by 4C. A row selecting circuit 7 is electrically connected to the first electrodes 2P, 2Q, and 2R, and the row selecting circuit 7 supplies a row selecting signal including row selecting potential $V_{select}$, non-selecting potential (GND), and clear potential $V_{del}$ to each row. Here the row selecting potential $V_{select}$ corresponds to the first potential of the present invention; the non-selecting potential (GND) corresponds to the reference potential of the present invention; and the clear potential $V_{del}$ corresponds to the fourth potential of the present invention. Moreover, the row selecting circuit 7 corresponds to the first selecting circuit of the present invention. A column selecting circuit 8 is electrically connected to the second electrode 4A, 4B, and 4C, and the column selecting circuit 8 supplies a column selecting signal including precipitation nucleus nucleating potential $V_{sig}$ and precipitation holding potential $V_k$ to each column. Here the precipitation nucleus nucleating potential $V_{sig}$ corresponds to the third potential of the present invention, and the precipitation holding potential $V_k$ corresponds to the second potential of the present invention. Moreover, the column selecting circuit 8 corresponds to the second selecting circuit of the present invention. These row selecting circuit 7 and column selecting circuit 8 are controlled by a control circuit 9 on a video signal. That is, the voltage values to be applied between the first electrodes 2P, 2Q, and 2R, and the second electrodes 4A, 4B, and 4C are set by a control unit including these row selecting circuit 7, column selecting circuit 8, and control circuit 9. Each piece of the potential mentioned above is selected so as to satisfy the following conditions with the first electrodes 2P, 2Q, and 2R used as cathodes and the second electrodes 4A, 4B, and 4C used as anodes.

$$V_{select} > GND > V_{del}$$

$$V_k - V_{del} > GND > V_k > V_{sig}$$

$$|V_{sig} - V_{select}| > |V_{th}| > |V_k - V_{select}| > |V_k|$$

Next, the operation of the electrolytic deposition display apparatus adopting the passive matrix drive system according to the present invention will be described with reference to FIG. 1. In FIG. 1, $V_P$, $V_Q$, and $V_R$ denote the potential of the row selecting signals to be supplied from the row selecting circuit 7 to the first electrodes 2P, 2Q, and 2R, respectively, and $V_A$, $V_B$, and $V_C$ denote the potential of the column selecting signals to be supplied from the column selecting circuit 8 to the second electrodes 4A, 4B, and 4C, respectively. Moreover, (P, A) in FIG. 1 denotes the potential of the second electrode 4A based on that of the first electrode 2P at an intersection part of the first electrode 2P and the second electrode 4A. Similarly, (Q, A) denotes the potential of the second electrode 4A based on that of the first electrode 2Q at an intersection part (Q, A) of the first electrode 2Q and the second electrode 4A, and (Q, B) denotes the potential of the second electrode 4B based on that of the first electrode 2Q at an intersection part (Q, B) of the first electrode 2Q and the second electrode 4B. These pieces of potential (P, A), (Q, A), and (Q, B) are exemplifications of representative parts of the intersection parts of the electrodes 2P, 2Q, and 2R, and 4A, 4B, and 4C, which are display regions.

First, the control unit including the row selecting circuit 7, the column selecting circuit 8, and the control circuit 9 performs the operation of selectively supplying any of the voltage values to be mentioned below to the electrodes of a plurality of pixels in a first nucleation period. The operation corresponds to the first operation of the present invention. The row selecting potential $V_{select}$ is sequentially supplied to the first electrodes 2P, 2Q, and 2R, and the precipitation nucleus nucleating potential $V_{sig}$ is supplied to the second electrode 4A in synchronization with the selecting potential $V_{select}$ of the first electrode 2Q. Moreover, the precipitation holding potential $V_k$ is supplied to the second electrodes 4B and 4C. A voltage value $|V_k - V_{select}|$, which is the potential difference between the precipitation holding potential $V_k$ and the selecting potential $V_{select}$, is thereby supplied to the intersection parts (P, A) and (Q, B). The voltage value corresponds to the second voltage value of the present invention. On the other hand, the voltage value $|V_{sig} - V_{select}|$, which is the potential difference between the precipitation nucleus nucleating potential $V_{sig}$ and the selecting potential $V_{select}$ is supplied to the intersection part (Q, A). The voltage value corresponds to the third voltage value of the present invention. Because the voltage value $|V_{sig}-V_{select}|$ at the intersection part (Q, A) is equal to or more than the deposition overvoltage value $|V_{th}|$ in this state, a current flows through the intersection part (Q, A), and precipitation nuclei of electroplating are nucleated. On the other hand, the voltage value $|V_k-V_{select}|$ at the intersection parts (P, A) and (Q, B) is less than the deposition overvoltage value $|V_{th}|$, no currents flow through the intersection parts (P, A) and (Q, B), and no precipitation nuclei of electroplating are nucleated. Moreover, the first voltage value $|V_k|$ of at least a predetermined voltage value or more is supplied to the intersection parts of the rows to which the row selecting potential $V_{select}$ is not supplied. The state produced by the operation is illustrated in FIG. 5A.

Successively, the row selecting potential $V_{select}$ is supplied to the first electrodes 2P, 2Q, and 2R in the first nucleus growth period, and the precipitation holding potential $V_k$ is supplied to the second electrodes 4A, 4B, and 4C. Thereby the voltage value $|V_k-V_{select}|$ which is the potential difference between the precipitation holding potential $V_k$ and the selecting potential $V_{select}$, is collectively supplied to all of the intersection parts. Because the precipitation nuclei of electroplating exist in the intersection part (Q, A) in this state, a current flows through the intersection part (Q, A) to precipitate electroplating although the voltage value $|V_k-V_{select}|$ in the first nucleus growth period is less than the deposition overvoltage value $|V_{th}|$. On the other hand, because no precipitation nuclei of electroplating exist in the other intersection parts, such as the intersection parts (P, A) and (Q, B), and because the voltage value $|V_k-V_{select}|$ in the first nucleus growth period is less than the deposition overvoltage value $|V_{th}|$, no currents flow through the intersection parts to precipitate no electroplating. This state is illustrated in FIG. 5B. That is, the control unit performs the operation of supplying the voltage value $|V_k-V_{select}|$ which is the second voltage value, to the electrodes of a plurality of pixels collectively after the first operation in the nucleus growth period. The operation corresponds to the second operation of the present invention.

The nucleation period and the nucleus growth period severally correspond to a sub field period. The nucleation period is very small in comparison with the nucleus growth period, and the width Ta of the nucleation period is smaller than the width Tb of the nucleus growth period by two or three digits. Consequently, the thickness of electroplating to be precipitated and a display characteristic depending on the thickness are controlled by the nucleus growth period. Moreover, the operations (subfield operations) performed in the sub field period include the first operation and the second operation mentioned above.

Next, the control unit performs the first operation mentioned above in the second nucleation period again. The row selecting potential $V_{select}$ is sequentially supplied to the first electrodes 2P, 2Q, and 2R in the second nucleation period, and the precipitation nucleus nucleating potential $V_{sig}$ is supplied to the second electrode 4B in synchronization with the selecting potential $V_{select}$ of the first electrode 2Q. Moreover, the precipitation holding potential $V_k$ is supplied to the second electrodes 4A and 4C. Thereby the second voltage value $|V_k-V_{select}|$ is supplied to the intersection parts (P, A) and (Q, A). On the other hand, the third voltage value $|V_{sig}-V_{select}|$ is supplied to the intersection part (Q, B). Thereby, a current flows through the intersection part (Q, B) to nucleate the precipitation nuclei of electroplating, and no currents flow through the intersection parts (P, A) and (Q, A) not to nucleate any precipitation nuclei of electroplating. The state formed by the operation is illustrated in FIG. 5C.

Successively, the control unit performs the above-stated second operation in the second nucleus growth period again. The row selecting potential $V_{select}$ is supplied to the first electrodes 2P, 2Q, and 2R, and the precipitation holding potential $V_k$ is supplied to the second electrodes 4A, 4B, and 4C. Thereby the second voltage value $|V_k-V_{select}|$ is collectively supplied to all of the intersection parts. Because the precipitation nuclei of electroplating exist at the intersection part (Q, B) in this state, a current flows and electroplating is precipitated although the second voltage value $|V_k-V_{select}|$ is less than the deposition overvoltage value $|V_{th}|$. In addition, electroplating is precipitated also at the intersection part (Q, A), at which electroplating has been formed in the prior first sub field period, similarly to the intersection part (Q, B). On the other hand, because no electroplating or the precipitation nuclei thereof exists at the other intersection parts, such as the intersection part (P, A), no electroplating is precipitated at the other intersection parts. This state is illustrated in FIG. 5D. Here, because no differences exist between resistance values of the intersection parts (Q, A) and (Q, B) from the information of FIG. 3C and currents flow equally, there are no cases where currents are concentrated at specific pixels, and uniform precipitations of electroplating are formed. Because electroplating has been precipitated at the intersection part (Q, A) for about twice the time of the intersection part (Q, B) in this state, the thickness of the electroplating at the intersection part (Q, A) is about twice the thickness of the electroplating at the intersection part (Q, B).

A gradation display is realized by repeating the above-stated subfield operation at least two times or more. Here, it is presumed in the present embodiment that a pixel including the intersection part (Q, B) is the first pixel, and that a pixel including the intersection part (Q, A) is the second pixel, which is required to have a gradation higher than that of the first pixel. In that case, the control unit performs the control of supplying the third voltage value to the second pixel at the first subfield operation prior to the second subfield operation of supplying the third voltage value to the first pixel. That is, the control of the gradation of each pixel in the electrolytic deposition display apparatus is enabled by the control unit's regulation of the timing of supplying the third voltage value, the subfield operation of supplying the third voltage value in other words, according to the gradation of a pixel. Here, the number of gradations is regulated on the number of times of the repetition of the subfield operation.

After a desired gradation display has been performed by the desired number of times of repetition of the above-stated subfield operation, the operation of the electrolytic deposition display apparatus moves to a display duration period. The control unit performs a display holding operation of supplying the non-selecting potential (GND) to the first electrodes 2P, 2Q, and 2R and supplying the precipitation holding potential $V_k$ to the second electrode 4A, 4B, and 4C in the display duration period. The display holding operation corresponds to the third operation of the present invention. Thereby the voltage value $|V_k|$ is collectively supplied to all of the intersection parts, and the displays of all of the pixels are held. The voltage value $|V_k|$ corresponds to the first voltage value of the present invention. The first voltage value is the one growing electroplating slightly so as to be almost equal to a redissolution reaction of the precipitated electroplating. Consequently, because the electroplating grown by the first voltage value is offset by the redissolution reaction, the display of the pixel is held.

After that, the operation moves to the clear period at the time of clearing the image. The control unit performs the clear operation of supplying the clear potential $V_{del}$ to the first electrodes 2P, 2Q, and 2R and supplying the precipitation holding potential $V_k$ to the second electrodes 4A, 4B, and 4C in the clear period. The clear operation corresponds to a fourth operation of the present invention. Thereby the voltage value $|V_k-V_{del}|$ for dissolving the electroplating precipitated on all of the pixels by oxidizing and ionizing the electroplating to dissolve the electroplating into the electrolytic solution 3 is supplied to all of the intersection parts, and the display is cleared. The voltage value $|V_k-V_{del}|$ corresponds to the fourth voltage value of the present invention.

According to the present embodiment, a desired gradation display for a desired time is enabled by regulating the number of times of the subfield operation to be repeated. For example, in the case of three gradations, the subfield operation is repeated by three times, and in the case of five gradations, the subfield operation is repeated by five times. Because the first operation is performed in a very short period in comparison with that of the second operation, the time of the subfield operation is substantially regulated by the time of the second operation. In both of the cases of three gradations and five gradations, although the numbers of times of the subfield operations differ from each other, a three-gradation display and a five-gradation display can be displayed in substantially almost the same time because the period of the second operation of the five gradations can be made to be ⅗ of the period of the second operation of the three gradations. Incidentally, although the period (nucleus growth period) of the second operation in each of the sub field periods is set to be almost the same in FIG. 1, the present invention is not limited to this method. For example, by setting the time rates of the nucleus growth periods of the sub field periods at the rates of $2^n$ (n is a natural number), such as 1:2:4:8 to differentiate the time rates from each other, a display of 16 gradations is enabled by performing the subfield operation four times.

Moreover, although the operation of the electrolytic deposition display apparatus adopting the passive matrix drive system has been described in the present embodiment, the present invention is not limited to this type of electrolytic deposition display apparatus, but the present invention can be applied to the electrolytic deposition display apparatus adopting an active matrix drive system. In the following, the electrolytic deposition display apparatus adopting the active matrix drive system will be described with reference to FIG. 6. Incidentally, the components similar to those described in FIGS. 2A and 2B are denoted by the same reference characters as those of FIGS. 2A and 2B, and their descriptions are omitted.

Figure 6:
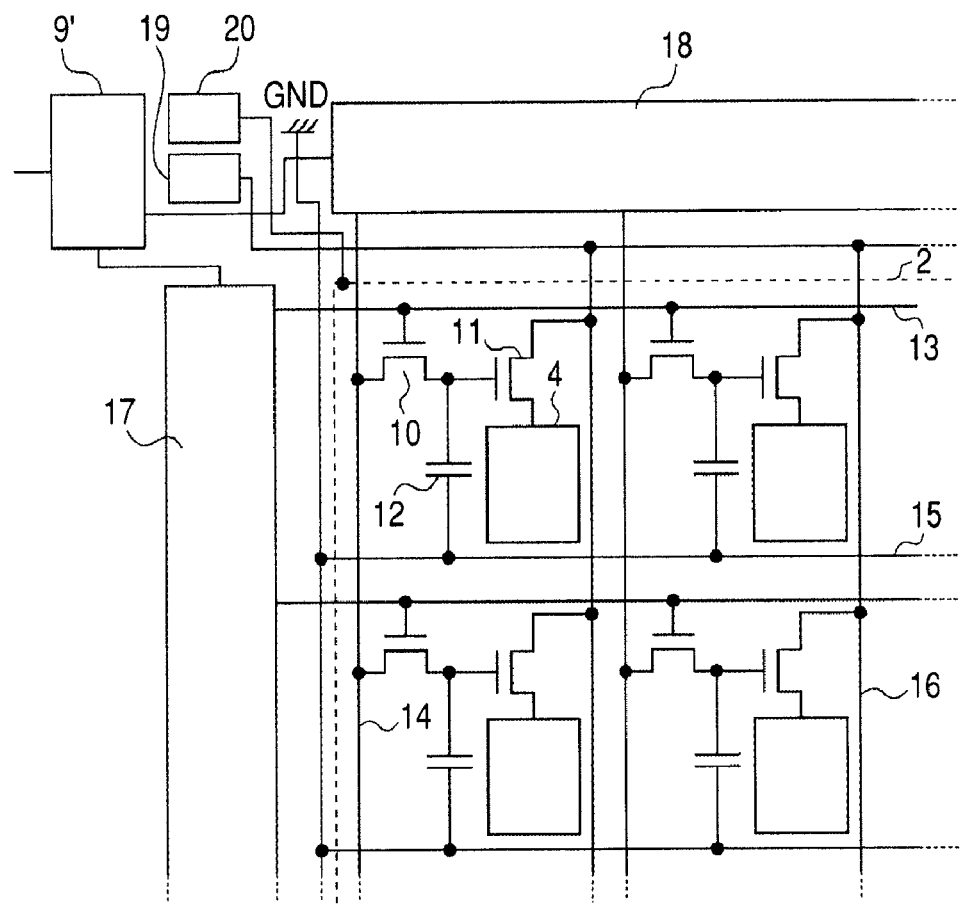
FIG. 6 is a schematic view illustrating an electrolytic deposition display apparatus adopting an active matrix drive system according to the present invention.

In FIG. 6, the electrolytic deposition display apparatus includes first and second switches 10 and 11, made of thin film transistors, storage capacitors 12, scanning lines 13, data lines 14, a ground line 15, and a common line 16. The source terminals of the second switches 11 are connected to the second electrodes 4, and the drain terminals of the second switches 11 are connected to the common line 16. Moreover, the gate terminals of the first switches 10 are connected to the scanning lines 13; the source terminals of the first switches 10 are connected to the data lines 14; and the drain terminals of the first switches 10 are connected to the gate terminals of the second switches 11 to control the conduction of the second switches 11. The electrolytic deposition display apparatus further includes a row selecting circuit 17 controlling the conduction of the first switches 10 by the row by supplying drive signals to the scanning lines 13, a column selecting circuit 18 supplying data signals to the data lines 14, a power source 19 for the second electrodes 4, a power source 20 for the first electrodes 10, and a control circuit 9'. The row selecting circuit 17 and the column selecting circuit 18 performs controls on video signals. That is, the voltage values applied between the first electrode 2 and the second electrode 4 are set by a control unit including these row selecting circuit 17, column selecting circuit 18, power source 19 for the second electrodes 4, power source 20 for the first electrodes 10, and control circuit 9'. The data signals are applied from the data lines 14 to the gate terminals of the second switches 11 and the storage capacitors 12 by the controls of the conduction/non-conduction of the first switches 10, and the applied data signals are stored in the storage capacitors 12. The second switches 11 are made to be in their conduction states by these operations, and the set voltages are applied to the second electrodes 4 from the power source 19 for the second electrodes 4. Thereby, the controls of the operations of precipitating electroplating are enabled.

Figure 7:
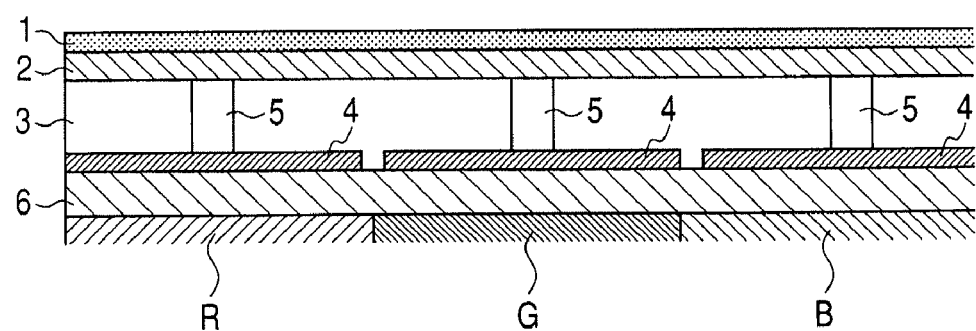
FIG. 7 is a schematic view illustrating an electrolytic deposition display apparatus according to another embodiment of the present invention.
Figure 8A:
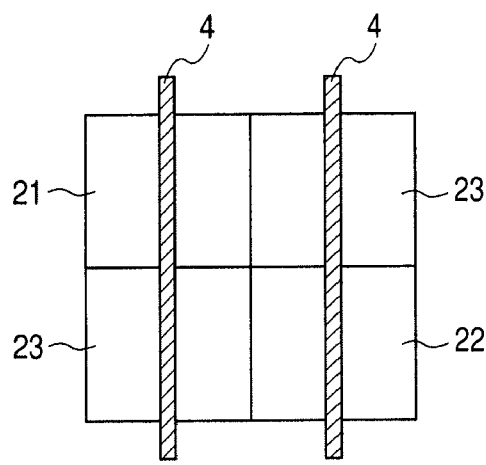
FIGS. 8A, 8B, 8C, and 8D are schematic views for describing shape examples of a second electrode according to the present invention.
Figure 8B:
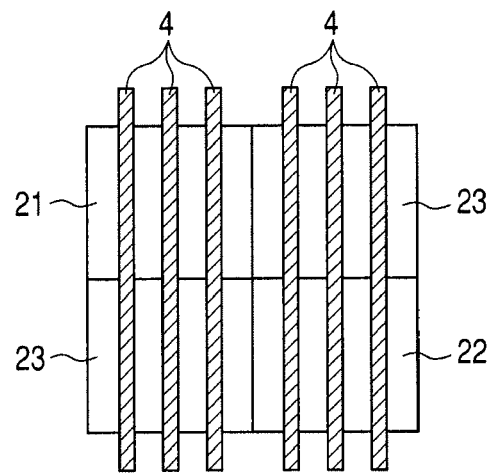
Figure 8C:
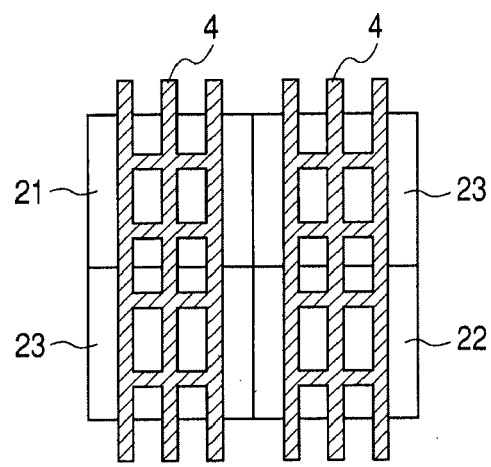
Figure 8D:
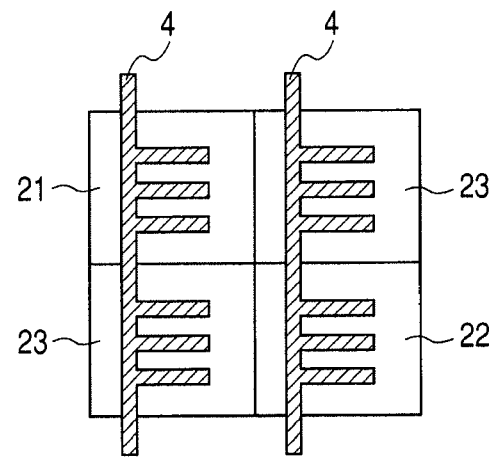

Moreover, although the second electrodes 4 are made of the metallic material same as those of the metal ions obtained by electrolytic depositions by the electroplating method in the present embodiment, the present invention is not limited to such second electrodes 4, and the second electrodes can be made of conductive materials transmitting light, such as ITO. In this case, color displays are enabled by adopting the configuration of arranging back lights on the back side of the supporting substrate 6, or the configuration of arranging a color filter having a reflection property on the back side of the supporting substrate 6 (FIG. 7) or between the second electrodes 4 and the supporting substrate 6. Moreover, even if no optically transparent materials are used, lights can be transmitted by adopting the second electrodes 4 having the shapes of thin lines, stripes, meshes, comb teeth, and the like, as illustrated in FIGS. 8A, 8B, 8C, and 8D, respectively. Reference characters 21, 22, and 23 denote color filters having reflection properties in FIGS. 8A to 8D. In the case of the Bayer array, the color filter 21 is a red one; the color filter 22 is a blue one; and the color filter 23 is a green one.

Figure 9:
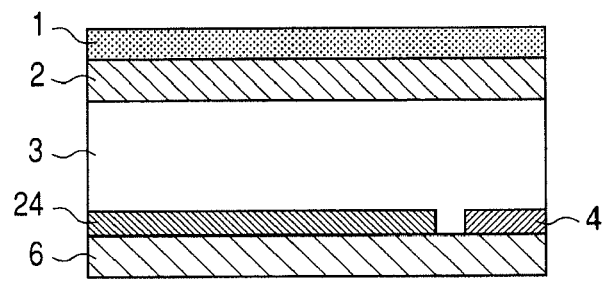
FIG. 9 is a schematic view illustrating an electrolytic deposition display apparatus adopting the active matrix drive system according to the present invention.

Moreover, although the description has been given to the mode of using the first electrode 2 and the second electrode 4 to each pixel in the present embodiment, the present invention is not limited to this mode. The present invention may adopt the mode of including a further third electrode 24 as illustrated in FIG. 9 and controlling the supply of potential so as to precipitate electroplating on the third electrode 24.

Moreover, although the description has been given to the case of using the first electrode 2 as a cathode and the second electrode 4 as an anode in the present embodiment, the present invention is not limited to this case. The present invention may adopt the case of using the first electrode 2 and the second electrode 4 as an anode and the third electrode 24 as a cathode in the mode of FIG. 9. Moreover, it is also possible to adopt the mode of suitably switching the modes mentioned above.

Moreover, in addition to the present embodiment, the color of electroplating to be nucleated may be controlled by controlling the current density flowing through the first electrode 2 and the second electrode 4, and the colored electroplating may be used for a gradation display. In this case, the above-mentioned function can be attained by adding the configuration enabling the controls of current densities to the control unit of the present embodiment.

Example 1

Examples of the structure of the electrolytic deposition display apparatus and the drive method thereof will be described. The present examples are concrete ones of switching the gradations from a white display to a transparent display into three gradations.

A glass plate having the thickness of 0.7 mm was used as the supporting substrate 1, and ITO of the thickness of 150 nm, which had been formed as a film by the sputtering method, was used as the first electrode 2. A solution including propylene carbonate as the solvent, and 0.033 mol/L of silver sulfate, 0.267 mol/L of tetraethyl ammonium bromide, and a brightening agent as solutes, was used as the electrolytic solution 3. The size of a pixel was designed to be 0.7 mm×0.7 mm, and the thickness of the electrolytic solution 3 was designed to be 0.1 mm. A silver film having the thickness of 3 μm was used as the second electrode 4, and the silver film was patterned to comb teeth by the photolithography and the etching. A silicon wafer was used as the supporting substrate 6. In accordance with FIG. 1, the precipitation critical voltage $V_{th}$ was −0.9 V. The following voltages were set as follows: the precipitation nucleus nucleating potential $V_{sig}$ was −0.5 V; the precipitation holding potential $V_k$ was −0.01 V; the row selecting potential $V_{select}$ was 0.5 V; the non-selecting potential (GND) was 0 V; and the clear potential $V_{del}$ was −1.5 V. Moreover, the following periods were set as follows: the nucleation period was 0.1 second; the nucleus growth period was 10 seconds; the display duration period was 10 seconds; and the clear period was 4 seconds.

Because no electroplating had been precipitated on the first electrode 2 before the starting of the operation of the present example and the second electrode 4 was patterned into the comb teeth, the present example was in the state in which incident lights transmitted from the surface of the supporting substrate 1 to the back surface of the supporting substrate 6 except the portion intercepted by the second electrode 4.

The voltage of −1.0 V was applied to a pixel (intersection point) (Q, A), and the current of 10 mA/cm² flowed to color the pixel a extremely light glossy color in the first nucleation period of FIG. 1. It was observed that fine particles of diameters of several nm, which were precipitation nuclei of electroplating, were discretely precipitated on the pixel (Q, A) by the observation with a scanning electron microscope. No silver was precipitated on the other pixels.

The voltage of −0.501 V was applied to all of the pixels, and the current of 5 mA/cm² flowed through the pixel (Q, A) to grow silver electroplating in the first nucleus growth period. The metal luster of a white color was viewed at the pixel (Q, A) at the time of the end of the first nucleus growth period, and the reflectance of the pixel (Q, A) was 10%. No electroplating was precipitated on the other pixels.

Next, the current of 10 mA/cm² flowed through the pixel (Q, B), and the precipitation nuclei of electroplating were formed to color the pixel (Q, B) an extremely light glossy color in the second nucleation period. Although the current of 5 mA/cm² was flowing through the pixel (Q, A), too, during this period, the influences of the current could be neglected because the period was a short time.

The voltage of −0.501 V was applied to all of the pixels, and the current of 5 mA/cm² flowed through the pixels (Q, A) and (Q, B) to grow electroplating in the second nucleus growth period. At the time of the end of the second nucleus growth period, the metal luster of a white color was viewed at the pixel (Q, B), and the reflectance of the pixel (Q, B) was 10%. Because the film thickness further increased at the pixel (Q, A), the reflectance of the pixel (Q, A) increased to 60%. No silver is precipitated on the other pixels. Thereby, the electrolytic deposition display apparatus realized three gradation displays of a transparent display, an intermediate display, and a white display.

Next, although the voltage of −0.01 V was applied to all of the pixels, and the current of 0.1 mA/cm² flowed through the pixels (Q, A) and (Q, B) to grow electroplating slightly in the display duration period, the pixels (Q, A) and (Q, B) became the state in which the displays were held because the growth of the electroplating was offset by the redissolution reaction of the precipitated silver.

Then, the voltage of 1.49 V was applied to all of the pixels, and the current of 15 mA/cm² flowed through the pixels (Q, A) and (Q, B) in the reverse direction to those in the nucleation period and nucleus growth period to oxidize and dissolve the electroplating in the clear period. Because no silver was precipitated on the other pixels, no reactions were caused and no currents flowed at the other pixels. Thereby, the electrolytic deposition display apparatus returned to the state before the operation of the present example.

Table 1 shows the potential of the respective electrodes, the voltages, the current densities, the electrification charge quantities of the respective pixels in the respective periods.

TABLE 1

| | | Period | | | | | |
|---|---|---|---|---|---|---|---|
| | | Nucleation 1 | Nucleus Growth 1 | Nucleation 2 | Nucleus Growth 2 | Display Duration | Clear |
| | | Time (Second) | | | | | |
| Period/Time | | 0.01 | 10 | 0.01 | 10 | 10 | 4 |
| Potential of Each Electrode (V) | 4A | −0.5 | −0.01 | −0.01 | −0.01 | −0.01 | −0.01 |
| | 4B | −0.01 | −0.01 | −0.5 | −0.01 | −0.01 | −0.01 |
| | 4C | −0.01 | −0.01 | −0.01 | −0.01 | −0.01 | −0.01 |
| | 2P | 0 | 0.5 | 0 | 0.5 | 0 | −1.5 |
| | 2Q | 0.5 | 0.5 | 0.5 | 0.5 | 0 | −1.5 |
| | 2R | 0 | 0.5 | 0 | 0.5 | 0 | −1.5 |
| Voltage of Each Pixel (V) | (P, A) | −0.5 | −0.51 | −0.01 | −0.51 | −0.01 | 1.49 |
| | (P, B) | −0.01 | −0.51 | −0.5 | −0.51 | −0.01 | 1.49 |
| | (P, C) | −0.01 | −0.51 | −0.01 | −0.51 | −0.01 | 1.49 |
| | (Q, A) | −1 | −0.51 | −0.51 | −0.51 | −0.01 | 1.49 |
| | (Q, B) | −0.51 | −0.51 | −1 | −0.51 | −0.01 | 1.49 |
| | (Q, C) | −0.51 | −0.51 | −0.51 | −0.51 | −0.01 | 1.49 |
| | (R, A) | −0.5 | −0.51 | −0.01 | −0.51 | −0.01 | 1.49 |
| | (R, B) | −0.01 | −0.51 | −0.5 | −0.51 | −0.01 | 1.49 |
| | (R, C) | −0.01 | −0.51 | −0.01 | −0.51 | −0.01 | 1.49 |
| Current | (P, A) | 0 | 0 | 0 | 0 | 0 | 0 |

TABLE 1-continued

| | | Period | | | | | |
|---|---|---|---|---|---|---|---|
| | | Nucleation 1 | Nucleus Growth 1 | Nucleation 2 Time (Second) | Nucleus Growth 2 | Display Duration | Clear |
| Period/Time | | 0.01 | 10 | 0.01 | 10 | 10 | 4 |
| Density of Each Pixel (mA/cm$^2$) | (P, B) | 0 | 0 | 0 | 0 | 0 | 0 |
| | (P, C) | 0 | 0 | 0 | 0 | 0 | 0 |
| | (Q, A) | 10 | 5 | 5 | 5 | 0.1 | −15 |
| | (Q, B) | 0 | 0 | 10 | 5 | 0.1 | −15 |
| | (Q, C) | 0 | 0 | 0 | 0 | 0 | 0 |
| | (R, A) | 0 | 0 | 0 | 0 | 0 | 0 |
| | (R, B) | 0 | 0 | 0 | 0 | 0 | 0 |
| | (R, C) | 0 | 0 | 0 | 0 | 0 | 0 |
| Electrification Charge Quantity of Each Pixel (mC/cm$^2$) | (P, A) | 0 | 0 | 0 | 0 | 0 | 0 |
| | (P, B) | 0 | 0 | 0 | 0 | 0 | 0 |
| | (P, C) | 0 | 0 | 0 | 0 | 0 | 0 |
| | (Q, A) | 0.1 | 50 | 0 | 50 | 1 | −60 |
| | (Q, B) | 0 | 0 | 0.1 | 50 | 1 | −60 |
| | (Q, C) | 0 | 0 | 0 | 0 | 0 | 0 |
| | (R, A) | 0 | 0 | 0 | 0 | 0 | 0 |
| | (R, B) | 0 | 0 | 0 | 0 | 0 | 0 |
| | (R, C) | 0 | 0 | 0 | 0 | 0 | 0 |

Example 2

Examples of the structure of the concrete electrolytic deposition display apparatus of the present invention and the drive method thereof will be described with reference to FIGS. 1 to 5D. The present examples are concrete ones of switching the gradations from a black display to a transparent display into three gradations.

The present example differed from the example 1 only in the material of the first electrode 2, and used a tin oxide film of the thickness of 150 nm as the first electrode 2. The drive method of the present example was the same as that of the example 1. Because the particles of the silver film precipitated on the tin oxide film by the precipitation of silver electroplating were sparse and the asperity of the silver film was large, the silver film absorbed lights and was viewed as the electroplating of a black color. The light transmittance of the pixel (Q, A) at the time of the end of the first nucleus growth period was 15%, and the light transmittance of the pixel (Q, A) at the time of the end of the second nucleus growth period was 2%.

Example 3

Figure 10:
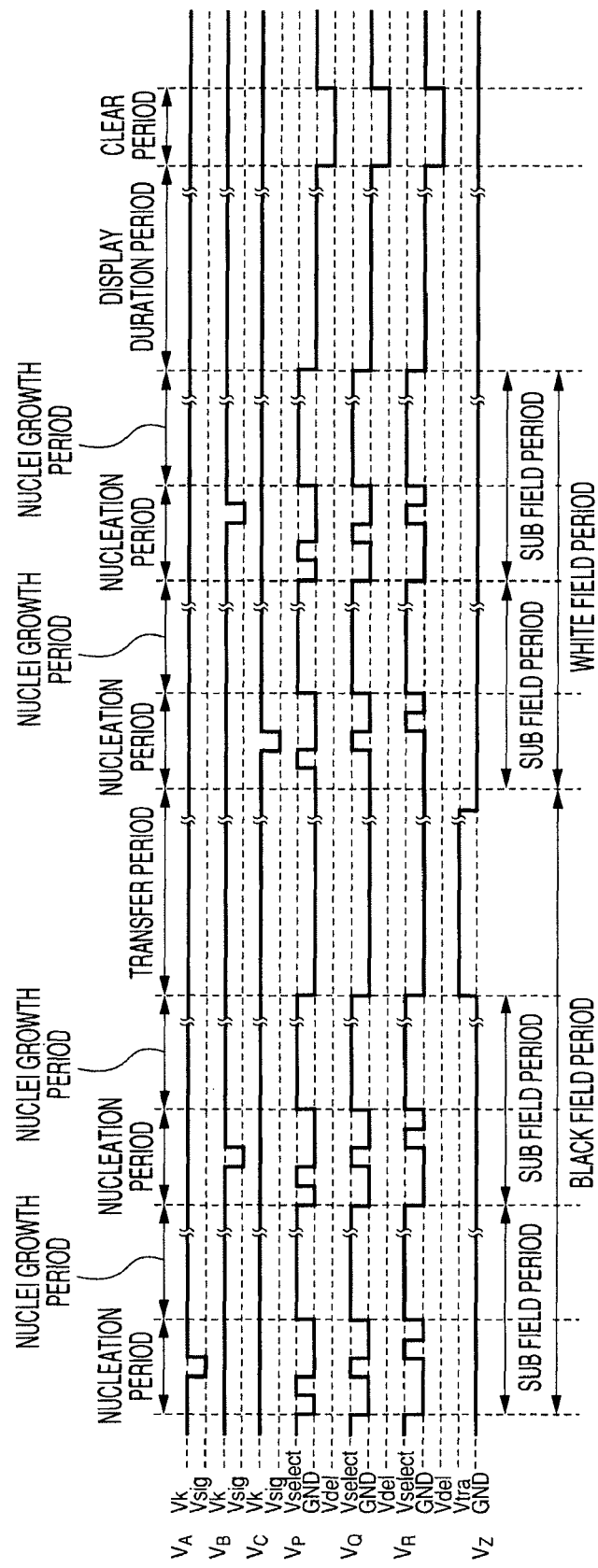
FIG. 10 is a timing chart of an electrolytic deposition display apparatus according to an example 3 of the present invention.

Examples of the structure of a concrete electrolytic deposition display apparatus of the present invention performing white-transparent gradation displays and black-transparent gradation displays and the drive method thereof will be described with reference to FIGS. 9 and 10. The present example differed from the example 1 in the point of including the second electrode 4 and the third electrode 24, both opposed to the first electrode 2. A silver film of the thickness of 3 μm was used as the second electrode 4, and a tin oxide film of the thickness of 150 nm was used as the third electrode 24. Moreover, the potential to be supplied to the third electrode 24 is denoted by Vz in FIG. 10. The other constituent elements were the same as those of the example 1.

First, a current was made to flow between the first electrode 2 used as a cathode and the second electrode 4 used as an anode. Thereby, the silver of the second electrode 4 was oxidized to be ionized, and the electroplating of silver was precipitated on the surface of the first electrode 2. Because the first electrode 2 was made of ITO, the electroplating assumed a white color. In this case, the supply source of the silver was the second electrode 4, the material itself of which was silver, and the supply source could supply the silver to the extent that the electroplating had a sufficient film thickness. The thicker the electroplating to be precipitated was, the higher the scattering property became. The gradation control from a transparent state having no electroplating to a white color state, in which electroplating was sufficiently thick, was enabled. Because the second electrode 4 was transparent, a part of incident lights was transmitted from the surface of the supporting substrate 1 to the back surface of the supporting substrate 6 in the transparent state. The method of controlling the thickness of the electroplating of each pixel performed subfield operations similarly to the example 1.

Next, in order to perform a gradation display of pixels from the transparent state to the black state, after the electroplating of the white color had been formed on the first electrode 2 by the method mentioned above, transfer potential $V_{tra}$ was supplied to the third electrode 24 of all of the pixels to use the third electrode 24 as an cathode, and a current was made to flow between the third electrode 24 and the first electrode 2 used as an anode. The transfer potential $V_{tra}$ corresponded to the fifth potential of the present invention. Thereby, a transfer voltage value $|V_{tra}|$ was supplied between the first electrode 2 and the third electrode 24, and the silver precipitated on the first electrode 2 was oxidized to be ionized, and the ionized silver was reduced to be precipitated on the surface of the third electrode 24 to form electroplating. Since the third electrode 24 was made of tin oxide, the electroplating assumed a black color. In this case, the supply source of the silver to be precipitated on the third electrode 24 was the electroplating precipitated on the first electrode 2, and consequently the thickness of the electroplating that had been precipitated on the first electrode 2 in advance regulated the thickness of the electroplating formed on the third electrode 24 on and after the application of the transfer voltage value $|V_{tra}|$. The thicker the electroplating was, the higher the absorption factor was. The gradation control from the transparent state, in which no electroplating was formed, to the black color state, in which the electroplating was sufficiently thick, was enabled. The period in which the fifth potential was supplied to the third electrode 24 was called a transfer period, and the operation was called a transfer operation. The gradation control by a plurality of times of subfield operations and the transfer operation in this manner were collectively called a black field operation. Moreover, a period in which the black field operation was performed was called a black field period.

After the black field operation, a current was again made to flow between the first electrode 2 used as the cathode and the second electrode 4 used as the anode, so that the silver on the second electrode 4 was oxidized to be ionized and the electroplating of silver was precipitated on the surface of the first electrode 2. Since the first electrode 2 was made of ITO, the electroplating thereon assumed a white color. In this case, the supply source of the silver was the second electrode 4, the material itself of which was silver, and then the silver can be supplied to the extent that the electroplating took a sufficient film thickness. The thicker the electroplating to be precipitated was, the higher the scattering property thereof was. The gradation control from a transparent state, in which no electroplating existed, to a white color state, in which electroplating was sufficiently thick, was enabled. Because the second electrode 4 was transparent, a part of incident lights was transmitted from the surface of the supporting substrate 1 to the back surface of the supporting substrate 6 in the transparent state. The method of controlling the thickness of the electroplating on each pixel performed the subfield operations similarly to the example 1. Thereby, the gradation displays from the transparent state to the white state of each pixel were enabled.

Then, when a current was made to flow between the second electrode 4 used as the cathode and the first electrode 2 and the third electrode 24 used as the anode, the electroplating precipitated on the surfaces of the first electrode 2 and the third electrode 24 was dissolved, and the first electrode 2 and the third electrode 24 returned to their transparent states.

While the present invention has been described with reference to exemplary embodiments, it is to be understood that the invention is not limited to the disclosed exemplary embodiments. The scope of the following claims is to be accorded the broadest interpretations so as to encompass all such modifications and equivalent structures and functions.

This application claims the benefit of Japanese Patent Application No. 2008-246338, filed Sep. 25, 2008, which is hereby incorporated by reference herein in its entirety.

What is claimed is:

1. An image display apparatus comprising:
   a plurality of pixels, each including a first electrode, a second electrode disposed in opposition to the first electrode and an electrolytic solution containing metal ion and disposed in contact with the first and second electrodes;
   a control unit for setting a value of a voltage applied between the first and second electrodes, so that a precipitation by an electroplating starts when the value of the voltage between the first and second electrodes exceeds a deposition overvoltage value, and the precipitation by the electroplating ends when, after the precipitation by the electroplating starts, the value of the voltage between the first and second electrodes is reduced into a predetermined value smaller than the deposition overvoltage value, wherein
   the control unit repeats at least twice a subfield operation including a first operation for applying selectively to each of the plurality of pixels a voltage of any one of a first voltage value larger than the predetermined value, a second voltage value lager than the first voltage value and smaller than the deposition overvoltage value and a third voltage value lager than the deposition overvoltage value, and a second operation for applying to the plurality of pixels the voltage of the second voltage value after the first operation, and wherein
   the control unit controls a gradation of the pixel according to a timing of applying the voltage of the third voltage value.

2. The image display apparatus according to claim 1, wherein
   the control unit performs controlling such that, when the plurality of pixels include a first pixel and second pixel of which displaying gradation is higher than that of the first pixel, the voltage of the third voltage value is applied to the second pixel during the subfield operation before the subfield operation of applying the voltage of the third voltage value to the first pixel.

3. The image display apparatus according to claim 1, wherein
   the control unit performs a third operation of applying the voltage of the first voltage value to the plurality of pixels, after repeating the subfield operation.

4. The image display apparatus according to claim 1, wherein
   the control unit performs a fourth operation of applying, to the plurality of pixels, the voltage of the fourth voltage value for oxidize and ionize the plating to be dissolved into the electrolytic solution.

5. The image display apparatus according to claim 1, wherein
   the control unit comprises a first selecting circuit for applying a first potential or a reference potential to the first electrode, a second selecting circuit for applying a second potential or a third potential to the second electrode, and a control circuit for controlling the first and second selecting circuits, and
   the first voltage value is a potential difference between the reference potential and the second potential, the second voltage value is a difference between the first and second potentials, and the third voltage value is a difference between the first and third potentials.

6. The image display apparatus according to claim 1, wherein
   the control unit has a structure capable of controlling a current density flowing between the first and second electrodes, to control smoothness of a surface of the electroplating contacting the first or second electrode.

7. The image display apparatus according to claim 1, wherein
   the pixel has further includes a third electrode.

8. A driving method of an image display apparatus, wherein
   a plurality of pixels are arranged, each of the pixels includes a first electrode, a second electrode disposed in opposition to the first electrode and an electrolytic solution containing metal ion and disposed in contact with the first and second electrodes,
   a precipitation by an electroplating starts when the value of the voltage between the first and second electrodes exceeds a deposition overvoltage value, and the precipitation by the electroplating ends when, after the precipitation by the electroplating starts, the value of the voltage between the first and second electrodes is reduced into a predetermined value smaller than the deposition overvoltage value, and wherein the driving method comprises steps of:
   repeating at lest twice a subfield operation including a first operation for applying selectively to each of the plurality of pixels a voltage of any one of a first voltage value larger than the predetermined value, a second voltage value lager than the first voltage value and smaller than the deposition overvoltage value and a third voltage value lager than the deposition overvoltage value, and a second operation for applying to the plurality of pixels the voltage of the second voltage value after the first operation; and
controlling a gradation of the pixel according to a timing of applying the voltage of the third voltage value.

9. The driving method according to claim 8, wherein
the step of controlling the gradation is performed such that, when the plurality of pixels include a first pixel and second pixel of which displaying gradation is higher than that of the first pixel, the voltage of the third voltage value is applied to the second pixel during the subfield operation before the subfield operation of applying the voltage of the third voltage value to the first pixel.

10. The driving method according to claim 8, wherein
a third operation of applying the voltage of the first voltage value to the plurality of pixels is performed, after repeating the subfield operation.

11. The driving method according to claim 8, wherein
a fourth operation of applying, to the plurality of pixels, the voltage of the fourth voltage value for oxidize and ionize the plating to be dissolved into the electrolytic solution is performed.

12. The driving method according to claim 8, wherein
the display apparatus comprises a first selecting circuit for applying a first potential or a reference potential to the first electrode, a second selecting circuit for applying a second potential or a third potential to the second electrode, and a control circuit for controlling the first and second selecting circuits, and
the first voltage value is a potential difference between the reference potential and the second potential, the second voltage value is a difference between the first and second potentials, and the third voltage value is a difference between the first and third potentials.

\* \* \* \* \*